INVENTOR.
FRIEDRICH-WILHELM TREPLIN
BY Dicke and Craig
ATTORNEYS

Aug. 30, 1966  FRIEDRICH-WILHELM TREPLIN  3,269,543
SIEVE ASSEMBLY FOR SELF-CLEANING SYSTEMS OF HEAT EXCHANGES
Filed Feb. 28, 1963  2 Sheets-Sheet 2
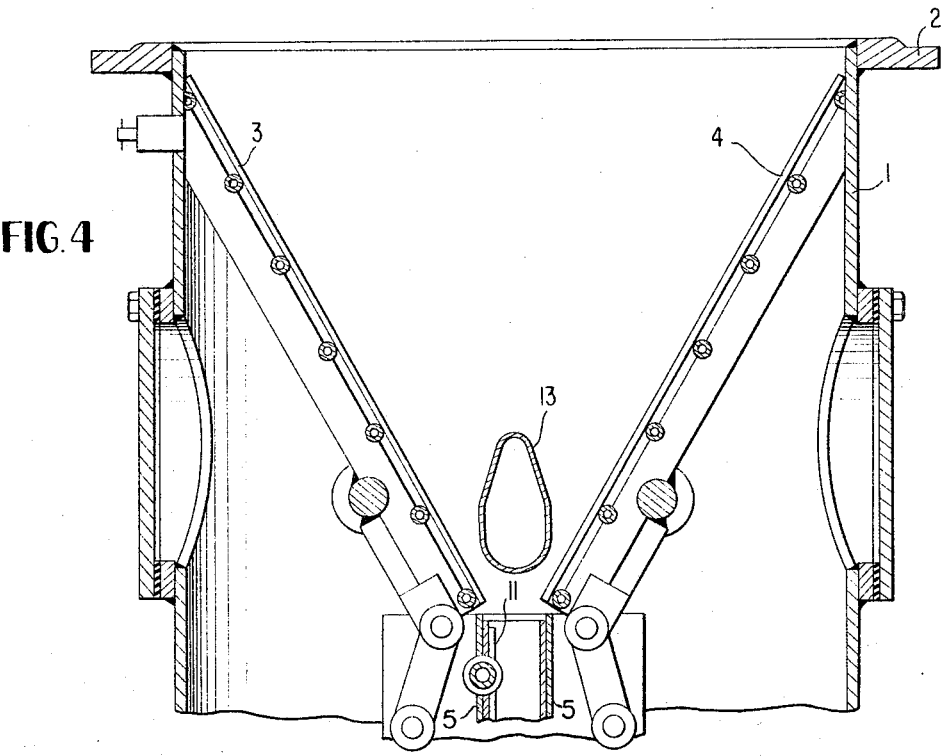
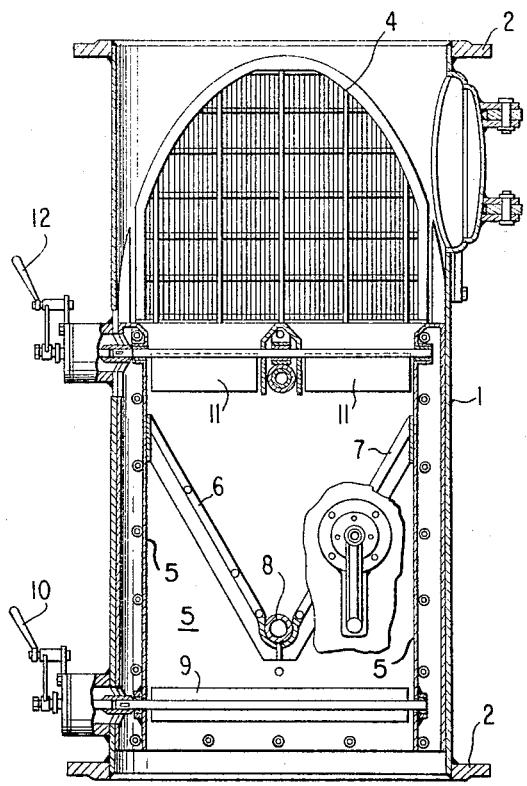
INVENTOR.
FRIEDRICH-WILHELM TREPLIN
BY
*Dicke and Craig*
ATTORNEYS United States Patent Office 3,269,543
Patented August 30, 1966

3,269,543
SIEVE ASSEMBLY FOR SELF-CLEANING
SYSTEMS OF HEAT EXCHANGER
Friedrich-Wilhelm Treplin, Angermund, Bezirk Dusseldorf, Germany, assignor to Ludwig Taprogge-Reinigungsanlagen für Rohren-Warmeaustauscher, Dusseldorf, Germany
Filed Feb. 28, 1963, Ser. No. 261,697
Claims priority, application Germany, Mar. 1, 1962,
T 21,682
4 Claims. (Cl. 210—316)

The present invention relates to an intercepting apparatus for intercepting the cleaning bodies circulated in self-cleaning installations for heat exchangers, and more particularly to a sieve assembly adapted to be built into the outlet pipe of a self-cleaning installation for tube-type heat exchangers, especially condensers and provided with throttle means for controlling the quantity of cooling water flowing into the funnel discharge portion of the sieve.

Self-cleaning installations for tube-type heat exchangers, and especially for condensers operate, as is known, with cleaning bodies that are for the most part of spherical shape and consist of sponge rubber or the like, whereby the cleaning bodies are introduced into the heat-exchanger tubes or pipes by means of the heat exchange medium flowing through the pipes and carry out therein their cleaning effect. U.S. Patent 2,801,824 to J. Taprogge of August 6, 1957, is representative of such prior art construction.

Forming part of such self-cleaning installations are intercepting devices, and more particularly sieve-type assemblies, for instance, as shown and described in FIGURES 16 through 18 of the U.S. Patent 3,021,117 to J. Taprogge of February 13, 1962, which are arranged in the outlet lines of the self-cleaning installations and serve the purpose to intercept the cleaning or rubbing bodies which are thereupon withdrawn from, for instance, sucked out of the sieve installation possibly with the aid of a return pump sucking the cleaning bodies out of the sieve assembly and returning the same by way of a connecting line to the inlet line of the tube-type heat exchanger.

Such sieve-type devices for self-cleaning installations of tube-type heat exchangers and especially for condensers normally consist, in the basic construction thereof, of a sieve pipe section or tubular member including two upper sieve surfaces arranged therein and inclined with respect to each other, a funnel-shaped sieve trough possibly made of perforated sheet metal and two lower sieves coupled to a discharge or outlet pipe for the cleaning or rubbing bodies. In the known sieve devices of this type the upper sieves have, as a rule, an inclination with respect to the direction of flow of approximately 30 to 45°. An inclination of approximately 30° has proved appropriate for the lower sieves. The individual sieve surfaces are thereby constructed for the most part as gap-type or slit-type sieves. The width of the slit or gap which may have a size of the order of between about 6 mm. and 12 mm. is selected with condensers, for example, depending on the mesh size of the pre-cleaning installations of the condensers, that is, depending on the size of the coarse contaminations within the cooling water.

Depending on the width of the gap or slot of the sieves and/or on the size and softness of the cleaning bodies, only a very limited average flow velocity of the heat exchanging medium may be permitted within the sieve pipe section or tubular member in which the sieves described hereinabove are arranged; for, in practice, the heat exchange medium presses the cleaning bodies which consist, for example, of sponge rubber or the like against the sieve rods where the cleaning bodies are readily retained by this abutment force. Additionally, with excessively high flow velocities cleaning bodies may be pressed through the sieve intended to intercept the same. With unfavorable conditions it is therefore necessary to considerably increase the diameter of the sieve assembly and of the sieve pipe section with respect to the diameter of the outlet line or discharge conduit into which the sieve assembly is installed, for example, in the discharge line of a condenser, in order to reduce the average flow velocity within the sieve. Since one seeks as even or uniform as possible a velocity profile of the flow at the inlet into the sieve pipe section, it is necessary to select the transition pieces leading to the sieve pipe section relatively long whereby not only the costs of the installation are further increased but also the installation oftentimes entails difficulties. Especially with sea water or river water condensers, the cooling water oftentimes contains impurities, contaminations and pollution in the form of weeds, algae, seaweed or other fibers which can pass through the existing pre-cleaning installations but may lead to a gradual clogging of the gap or slot sieves within the sieve installation itself. When a certain degree of clogging or soiling of the sieves is reached and if the gaps of the sieve surfaces are reduced to such an extent that shell, stones, pieces of wood and other similar coarse parts can no longer pass therethrough, then the movements of the rubbing bodies or cleaning bodies over the sieve surfaces is impaired, the cleaning operation has to be interrupted and the sieve surfaces have to be washed-out, for example, flushed out with water. Particularly susceptible to soiling are the lower sieves since the load on the spherical cleaning bodies is very much larger thereat per surface unit of the sieve and per time unit than at the upper sieves; on the other hand, by reason of the slight dimension of the flow cross section a sufficient turbulence is missing thereat in order to loosen or free again those cleaning bodies that may have become stuck thereat once.

The present invention is concerned with the task to improve the sieve installation for self-cleaning apparatus of tube-type heat exchangers, especially of condensers, as described in U.S. Patent 3,021,117, in such a manner that it is possible to do away with a widening of the line into which the sieve assembly is built into so that the sieve pipe section may have the same diameter as the line into which the sieve assembly is installed. Nonetheless, according to the present invention a safe interception of the cleaning bodies at all velocities of the heat exchanging medium is to be assured, so that any lodging of cleaning bodies within the sieve assembly is avoided and therebeyond a sufficient cleaning of the lower sieves is rendered possible without substantial interruption of the cleaning operation.

More particularly, the present invention relates to a sieve assembly for self-cleaning intallations of tube-type heat exchangers, especially condensers, which consists of a sieve pipe section including upper sieves arranged in the sieve pipe and inclined toward each other, and a sieve box possibly made of perforated sheet metal, including lower sieves inclined with respect to each other connected with a discharge line or outlet pipe for the cleaning bodies. The present invention essentially consists in providing at least one throttle means in or at the sieve installation for controlling the quantity of cooling water flowing into and through the sieve box.

The present invention is predicated on the consideration that the force component perpendicular to the sieve surfaces, that is the force which presses the cleaning bodies through the sieves or against the sieves and retains the same at the sieves becomes smaller by a more steep inclination of the sieve surfaces of the upper sieves and possibly also of the lower sieves with respect to the direction of flow. It is therefore possible, in principle, to obtain the same effect heretofore sought by enlargement of the sieve pipe section by providing a more steeply inclined sieve surface. Of course, the disadvantage of a somewhat increased resistance of the overall sieve installation has to be accepted in that case. This increased resistance of the sieve surfaces, however, increases the funnel effect of the upper sieves which now, by the particular position thereof, deflect the quantities of heat exchanger medium flowing into the sieve toward the center of the installation which leads to an acceleration of the central stream lines flowing into the sieve and therewith to an additional load of the lower sieves. This funnel effect of the upper sieves becomes noticeable in a particularly unfavorable manner if one attempts as desired to clean the lower sieves during operation of the installation. To obviate the aforementioned disadvantages one might think to further incline the lower sieves. However, apart from the fact that no considerable simplification and reduction in cost of the installation is achieved thereby and the installation difficulties are not solved thereby, the funnel effect of the upper sieves would only be increased thereby because the open sieve surfaces in the sieve box would be increased. On the other hand, the lower sieves inherently have the same funnel effect as the upper sieves and this effect is increased with a decrease of the angle of inclination of the sieves with respect to the direction of flow. Consequently, if one seeks to counter the funnel effect of the lower sieves, then the withdrawn or sucked-off quantity of water that flows through the sieve box in response to the suction pump would have to be increased. This, however, would again be disadvantageous. On the other hand, if one proceeds according to the teachings of the present invention and arranges at least one throttle means for the control of the quantity of heat exchanger medium flowing into this sieve box, then obviously the quanity of heat exchanger medium which flows into the sieve box may be throttled and therewith not only the load on the lower surfaces is reduced but also one may operate with a considerably smaller suction quantity.

The throttling means of the present invention may be arranged in any suitable known form either below or above the lower sieve. A throttle means disposed below the lower sieves offers the advantage that it may also be closed completely without directly impairing by the throttle means the circulation of the cleaning bodies. On the other hand, if the throttle means are arranged above the lower sieve, then care must be taken, of course, that at least in continuous operation sufficient space is present for the passage of the cleaning bodies in conjunction with any possible coarse contamination or impurities. In the presence of coarse impurities and contamination on the lower sieves, the construction with the throttle means above the lower sieve is of particular advantage if the throttle means is constructed that it can be closed completely. For if the funnel portion is completely closed at the inlet, then water drawn through the upper sieves has to flow through the lower sieve surfaces in the backward direction to be sucked-off by the return pump whereby impurities, contaminations or the like deposited thereat are disengaged therefrom and are removed with the returning water. The simultaneous use of throttle means above and below the sieves may be appropriate and of particular advantage.

In particular, in connection with the construction and arrangement of the throttle, the present invention is characterized by arranging within the sieve box an adjustable closure flap or valve as throttle means and by connecting the discharge pipe for the cleaning bodies laterally at the sieve box above the closure flap or valve as seen in the direction of flow. The portion of the sieve trough below the valve then serves as a drain or flow-through portion for water in the sieve trough which may be closed to slow the flow therethrough.

According to a modified construction in accordance with the present invention, an adjustable closure flap or valve is also arranged ahead of the sieve box as the throttle means. However, the throttle means disposed above the lower sieves may also be constructed, for example, in the form of a guide body which is so arranged that a part of the quantity of heat exchanging medium flowing in the direction toward the sieve box is guided past such guide body. In this manner, any pressure head or damming of the heat exchanging medium at the inlet to the sieve box portion is avoided which might otherwise lead to the consequence that the cleaning bodies do not enter into the sieve box but instead remain as if stuck at the inlet thereof. Of course, the three measures described hereinabove may also be realized simultaneously with advantage.

The advantages obtained by the present invention reside, in summary, in the fact that an enlargement of the pipe cross section of the sieve assembly as compared to the line or conduit into which the sieve assembly is installed or built into is no longer necessary since an adaptation or matching to any desired operating conditions may be attained without any difficulties by the adjustment of the throttling means.

Accordingly, it is an object of the present invention to provide a sieve arrangement for use with self-cleaning heat exchanger installations which eliminates, by simple means and in an effective manner, the aforementioned disadvantages and shortcomings encountered with the prior art constructions.

It is another object of the present invention to provide a sieve installation of the type described hereinabove which may be readily built into the outlet line of a self-cleaning installation for heat exchangers or the like and which obviates the need for enlarging the pipe section containing the sieve assembly.

Still another object of the present invention resides in the provision of a sieve assembly for use in a self-cleaning installation of heat exchangers in which the flow conditions in relation to the various parts of the sieve assembly are so controlled that excessively high abutment pressures forcing the cleaning bodies against the sieve rods are prevented, the average flow velocity of the heat exchanging medium is maintained relatively high and long transition pieces between the sieve pipe section and the heat-exchanger discharge pipes or lines are avoided.

Still a further object of the present invention resides in the provision of a sieve apparatus for use with cleaning installations for heat exchangers which may be constructed relatively inexpensively, may be readily installed without difficulties and assures proper operation of the installation without the need for costly and time consuming shutdowns.

Another object of the present invention resides in the provision of a sieve assembly for use with a self-cleaning installation for heat exchangers of the tube-type in which any clogging-up within the sieve assembly is effectively prevented, even in the presence of relatively coarse impurities, which permits a safe and reliable withdrawal of the cleaning bodies and return thereof to the inlet of the self-cleaning installation, and which automatically produces a self-cleaning action.

These and other objects, features and advantages of the present invention will become more obvious from the following description when taken in connection with the accompanying drawing which shows, for purposes of illustration only, one embodiment in accordance with the present invention, and wherein:

FIGURE 3 is an axial cross sectional view, displaced by 90°, through the sieve installation in accordance with the present invention, taken along line 3—3 of FIGURE 1 and, FIGURE 4 is a partial cross sectional view, on an enlarged scale, of the sieve installation of FIGURE 1 and showing in greater details the arrangement and effect of the guide body in accordance with the present invention.

Figure 1:
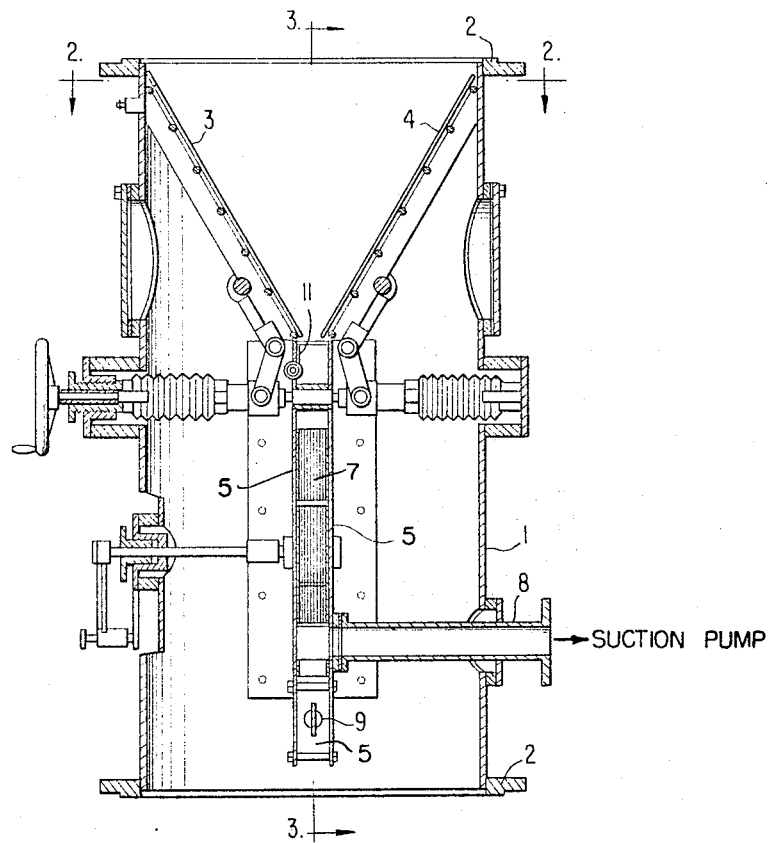
FIGURE 1 is an axial cross sectional view through a sieve installation in accordance with the present invention.
Figure 2:
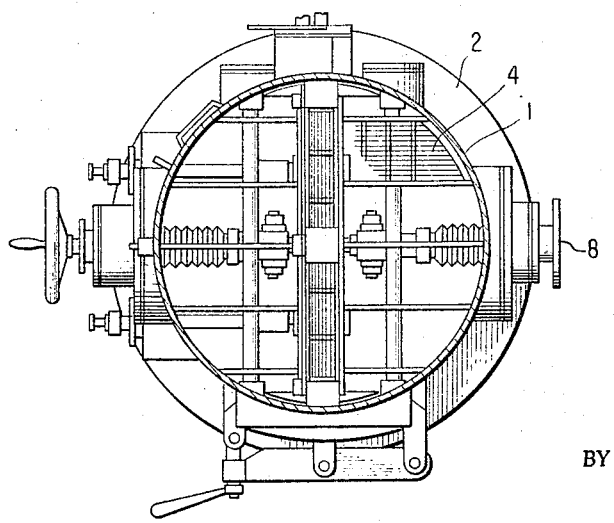
FIGURE 2 is a horizontal cross sectional view through the sieve installation of FIGURE 1, taken along line 2—2 thereof.

Referring now to the drawing wherein like reference numerals are used throughout the various views to designate like parts, the sieve assembly illustrated in the various figures thereof is intended for use with self-cleaning installations especially of tube-type heat exchangers, particularly of condensers, such as disclosed in U.S. Patent 3,021,177, and essentially consists in its basic construction of the sieve pipe section or tubular pipe member 1 provided with connecting flanges 2 on either end thereof for connection with the lines or conduits into which the sieve installation in accordance with the present invention is to be installed. Within the sieve pipe section 1 are arranged two upper sieve members 3 and 4 of generally funnel shape inclined with respect to each other and with respect to the direction of flow through the sieve pipe and being spaced along adjacent edges to form a by-pass opening 14 around the sieves 3 and 4. A sieve box 5 made up of rectangular plates, which preferably form a box enclosed on four sides by the plates, but may also be made of perforated sheet metal, has one open end or inlet thereof in communication with the by-pass opening 14 and the other open end or outlet thereof in communication with the main stream of flow in the sieve pipe downstream of the upper sieve members 3 and 4 so that the flow through the sieve pipe is effectively divided into a main stream and a subsidiary stream flowing through the sieve box, the two streams ultimately joining once again below the sieve box.

The sieve box 5 also includes a funnel shaped lower sieve extending entirely across the sieve box and formed for the most part by two lower sieve members 6 and 7, which are inclined to the direction of flow through the sieve box. The sieve box 5 additionally includes a discharge pipe 8 connected to the side of the sieve box 5 at the lower point of the funnel shaped lower sieve formed by sieve members 6 and 7 as as to withdraw the cleaning members directed into the sieve box and direct them back to the heat exchanger in the known manner. The throttle means for the control of the cooling water quantity flowing into the box 5 are provided in the illustrated embodiment. One throttle essentially consists of a closure flap or valve 9 arranged within the sieve box at the outlet thereof to the main stream of the sieve pipe which flap or valve 9 is adapted to be adjusted by means of an adjusting handle or crank 10 whereby in this embodiment the discharge pipe 8 for the cleaning bodies is connected laterally in the sieve box above the closure valve 9 as seen in the direction of flow and thus the velocity of flow through the sieve box can be regulated without materially affecting the amount of flow into the discharge pipe 8. Furthermore, a stationary throttle means in the form of a guide body 13 is arranged above the gap formed at the discharge point by the upper sieve portions, in addition to a further closure flap or valve 11 adapted to be closed by way of an adjusting handle 12. The valve 11 serves to adjust the quantity of flow through the sieve box and thus into the discharge pipe 8. By adjusting one or both of the throttling means 9 and 11 the operating conditions including quantity and velocity of flow may always be so selected that all cleaning bodies which are taken along by the heat exchanger medium passing through the sieve installation, may be intercepted and returned by way of the discharge pipe 8 to the inlet side of the heat exchanger (not shown) without requiring such a high water pressure within the sieve box to produce a wedging or lodging of the bodies in the sieves. The sieve pipe section 1 may itself be identically matched thereby to the line or conduit into which the sieve installation is to be built in. Enlarged cross sections are no longer necessary. The guide body 13 suppresses any harmful cross streams. Additionally, by the complete closure of the sieve trough with the aid of the closure valve 11 the lower sieves 6 and 7 may be readily cleaned during operation by reverse flow of water through the lower sieves.

In summary, the valves 9 and 11 can be regulated in a coordinate manner to control the quantity and velocity of flow within the sieve box 5. Gradual closing of the valve 11 reduces the quantity of flow into the sieve box 5 to the ideal level necessary to carry all of the cleaning bodies into the discharge pipe 8 with a minimum diversion of fluid from the main flow, it also makes possible upon closing thereof to a point where the quantity of flow into the sieve box is less than that which the pump connected to the line 8 is capable of drawing, a diversion of water in the reverse direction through the lower sieves 6 and 7 to effect a self-cleaning thereof. In addition, a closing of valve 9 reduces the outlet opening of the sieve box and therefore serves to adjust the velocity of flow through the lower sieves 6 and 7 to a value where clogging thereof with cleaning bodies is substantially eliminated.

While I have shown and described one embodiment in accordance with the present invention, it is understood that the same is not limited thereto but is susceptible of numerous changes and modifications within the spirit and scope thereof, and I therefore do not wish to be limited to the details shown and described herein but intend to cover all such changes and modifications as are encompassed by the scope of the appended claims.

I claim:

1. In a self-cleaning tube-type heat exchanger, especially a condenser, a sieve installation comprising sieve pipe means, a pair of upper sieves mounted across said sieve pipe means at an inclination to the direction of flow therethrough and forming between adjacent edges thereof a by-pass opening, sieve box means within said sieve pipe means for separating the flow through said sieve pipe means into two streams, said sieve box means having closed side walls and open ends defining an inlet and an outlet therein and a discharge opening intermediate the ends in a side wall thereof, the inlet of said sieve box means communicating only with the by-pass opening formed by said upper sieves to divert part of the flow around said upper sieves and through said sieve box means, and said outlet communicating with said sieve pipe means downstream from said upper sieves, a lower sieve mounted entirely across said sieve box means between said discharge opening and said outlet of said sieve box means and having portions inclined to the direction of flow therethrough, discharge pipe means connected to said discharge opening in said sieve box means and extending out of said sieve pipe means, and throttling means within said sieve box means for controlling the proportionate amount of flow into said sieve box means as compared to the amounts passing through said upper sieves and around said sieve box means.

2. A sieve installation as defined in claim 1 further including stationary guide body means mounted adjacent to said by-pass opening and in direct line of flow therewith upstream from said upper sieves.

3. A sieve installation as defined in claim 1 wherein said throttling means includes one adjustable closure means mounted in the inlet of said sieve box means ahead of said discharge opening in the direction of flow.

4. A sieve installation as defined in claim 3 further including additional adjustable closure means mounted in the outlet of said sieve box means downstream from said lower sieve.

References Cited by the Examiner
UNITED STATES PATENTS

| | | | |
|---|---|---|---|
| 122,291 | 12/1871 | Taft | 210—420 X |
| 1,370,685 | 3/1921 | Denker et al. | 210—411 X |
| 1,710,208 | 4/1929 | Dietz | 209—270 X |
| 2,132,961 | 10/1938 | Morgan | 209—139 |
| 3,021,117 | 2/1962 | Taprogge | 165—95 |

REUBEN FRIEDMAN, *Primary Examiner.*

FRANK W. LUTTER, *Examiner.*

J. DE CESARE, S. B. WILLIAMS, *Assistant Examiners.*